United States Patent

[11] 3,579,837

[72] Inventor Charles A. Soriano
      Fairfield, Conn.
[21] Appl. No. 832,570
[22] Filed June 12, 1969
[45] Patented May 25, 1971
[73] Assignee Atwater-Forbes Corporation
      Westport, Conn.

[54] FOOT MEASURING APPARATUS
    7 Claims, 10 Drawing Figs.
[52] U.S. Cl. ................................................. 33/3
[51] Int. Cl. ......................................... A43d 1/00
[50] Field of Search ....................................... 33/3, 4—6

[56] References Cited
    UNITED STATES PATENTS
3,032,880  5/1962  Shaw ............................. 33/3
3,360,862  1/1968  Darvin ............................ 33/3
3,494,036  2/1970  Stiebel et al. .................... 33/3

Primary Examiner—Leonard Forman
Assistant Examiner—Charles E. Phillips
Attorney—Pennie, Edmonds, Morton, Taylor and Adams ABSTRACT: A portable, battery-operated human foot-measuring apparatus is provided for simultaneously measuring the arch length and related width length of the foot as well as the heel-toe length. The apparatus operates in such a manner that one can measure either right or left foot within a single four sided measuring zone without mechanical rotation or change of scales and electronic readout means are provided for indicating all measurements.

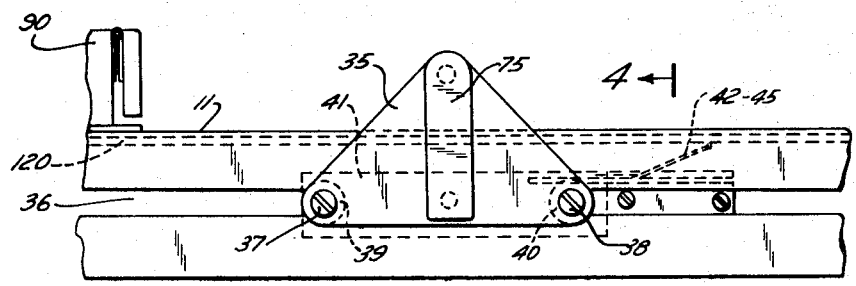
FIG. 3
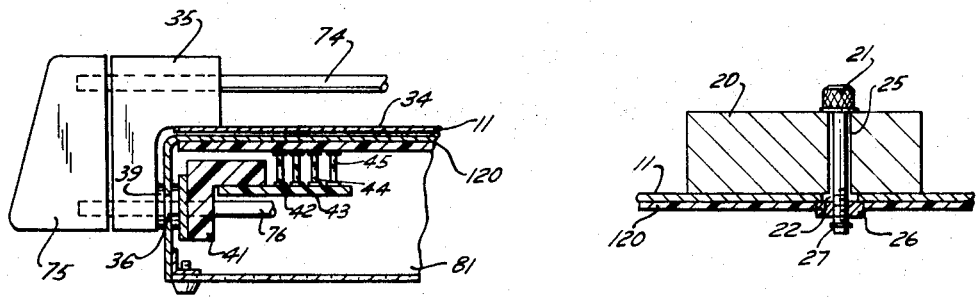
FIG 4
FIG. 2
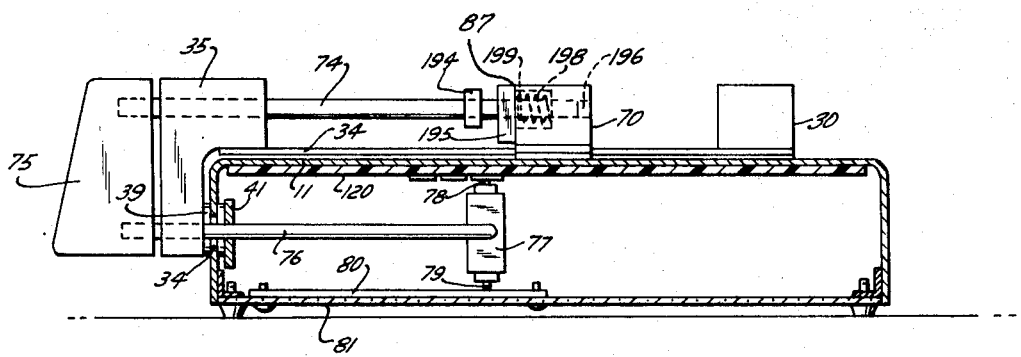
FIG. 5

INVENTOR
CHARLES A. SORIANO
BY
Pennie, Edmonds, Morton, Taylor & Adams
ATTORNEYS

FOOT MEASURING APPARATUS

BACKGROUND OF THE INVENTION

1. Field of the Invention

The present invention relates to improvements in a foot-measuring device and more particularly is directed toward an electronic unit for use in measuring the sizes of the human foot by simultaneously indicating arch length and width, and by separately indicating toe length, by means of mechanical sensors coupled with an electronic cold cathode figure indicator. This apparatus is an aid in fitting and merchandising properly fitted shoes.

2. Description of the Prior Art

It has long been accepted in the shoe industry that there are three important measurements of the human foot which determine the correct shoe size. These are: (1) toe length, i.e., the distance from the back end of the heel to the front end of the furthest extending toe; (2) arch length, i.e., the distance from the back end of the heel to the soft tissue prominence medial to the first metatarso-phalangeal joint, this prominence hereinafter is referred to by its more common name — "The ball of the foot;" and (3) the width of the foot, i.e., the horizontal foot breadth which is the line taken along the rectangular abscissa of the long plane defined by the diagonal between the prominence of the first metatarso-phalangeal joint and the fifth metatarso-phalangeal joint.

Most prior art devices for determining these measurements are mechanical in nature, consisting of metal frames and gauge blocks which move across shoe size scales. These devices suffer from a number of disadvantages.

For most people the arch-length shoe size is the same as the toe-length shoe size. This is due to the fact that the arch length is generally proportional to the toe length; every 0.222 inches of arch length is equal to 0.333 inches of toe length. Any deviation in this proportion indicates that the foot is podiatrically variant from the norm. Today an ever increasing number of people have a variation in their arch-length toe-length proportion. Since last manufacturers make width sizes proportional to the one overall shoe length size, a fitting problem is created when the arch length-toe length are out of proportion. Realizing this, these devices generally measure the toe length, and then the arch length of the foot, and with these sizes in mind select a point of reference for measurement of the correct width size. The correlation of the varied lengths for correct width determination presents disadvantages and real difficulty for the neophyte. The process calls for two measurements, the correlation, and then a third measurement. If any of these measurements are improperly made, due to human error, inaccurate scales, or problems caused by curvature or parallax between the foot and the measuring scale, the size and fit will be incorrect. Another disadvantage accrues when because of the complexity of this process and the possibility of error, the fitter omits part of the process, thereby severely reducing the probability of a correct fit.

Until recently it was assumed that the widest portion of the foot was the distance from the ball of the foot to the point on the other side of the foot perpendicular to the heel-toe line. Because of this assumption the prior art devices have used an interior arch block with a means of accepting the ball of the foot and an exterior width block with a long straight edge parallel to the heel-toe line. Because of these construction limitations most devices were made so that one foot is measured, then the device is rotated 180° and the other foot is measured. This design necessitates the use of two overlapping scales which are often confusing to both the customer and the fitter. This confusion along with the need to rotate the equipment often means that only one foot is measured; the other foot is assumed to be the same size. This is an unacceptable procedure and does not yield a proper fit. Some devices in an effort to overcome the disadvantages inherent in rotated equipment are constructed with two independent measuring zones, two sets of measuring blocks, and two separate scales. This equipment suffers from disadvantages caused by weight, size, complexity and cost.

As noted above one of the disadvantages of the prior art is the overlapping and confusion of the scales. Automatic foot measuring machines have been proposed which would give electronic readings of the scales, as shown for example in U.S. Pat. Nos. 3,032,880 and 3,192,627. While these devices sometimes give clear readings they suffer from the problem of having two separate foot-measuring zones. This requires that the system by necessity have two complete electrical circuits and a correlated readout system. These features cause such devices to have a large number of parts, high friction requirements and low electronic reliability which sometimes yields unintelligible or confusing size indications. In addition, these devices suffer from all of the weight and size problems inherent to the mechanical devices using two-measuring zones.

Some devices have dispensed with the arch-length measurement. By doing this one zone can be used to measure both right and left feet. One device of this nature also correlates the toe length to the appropriate width length, as shown in U.S. Pat. No. 3,360,862. The disadvantage of this class of prior art devices is that they do not measure the arch length, and therefore, will not note, and can make no provision for the foot in which the arch length is different from the toe length. The device which correlates toe length to width is most likely to select the incorrect size for the deviant foot since in numerous studies it has been shown that the arch length-width provides a much more accurate selection for the deviant foot than the toe length-width measurement.

BRIEF DESCRIPTION OF THE INVENTION

A foot-measuring apparatus is disclosed which can alternately measure the arch length size and related width length size of either the right or left foot on a single foot-receiving zone with a common electrical indicator. This apparatus which can also independently measure toe-length size is comprised of a platform having a foot-receiving zone thereon. The measuring area is defined by a generally stationary heel block member which forms a latitudinal bottom boundary; a longitudinally moveable member which forms one lateral edge of the zone and which has a means of accepting the ball of one foot for width measurement; a longitudinally and laterally moveable member which forms the other lateral edge of the zone and which also has a means for accepting the ball of the other foot for width measurement; and finally, a longitudinally moveable member which forms the top boundary of the receiving area and which can be placed in contact with the top or toe of the foot to measure toe-heel length. Means are provided for maintaining the planar innerface surfaces of the lateral block members parallel to each other while permitting movement of one of the lateral block members with respect to the other along a line perpendicular to the toe-heel line of the foot. Means are provided for measuring the arch length or distance from the heel block to the point perpendicular to the lateral block holding the ball of the foot, the width or the distance between the two blocks forming lateral boundaries of the foot-measuring zone, and the toe length or the distance from the heel block to the block forming the top of the foot-measuring zone.

In accordance with a principal feature of the present invention means for measuring arch length and width sizes are mechanically connected together and electrically sensed and indicated in such a way as to provide a correlated reading as to shoe length and corresponding appropriate shoe width.

BRIEF DESCRIPTION OF THE DRAWINGS

Other advantages and features of the invention will be apparent form the following detailed description with reference to the drawings in which:

FIG. 2 is a fragmental cutaway view taken along line 2—2 of FIG. 1 showing the heel block which forms a base for the foot-measuring zone;

FIG. 3 is a fragmental cutaway side view of the apparatus taken along the line 3–3 of FIG. 1;

FIG. 4 is a fragmental cutaway view of the apparatus taken along the line 4–4 of FIG. 2 showing the arch length-measuring equipment;

FIG. 5 is a sectional cutaway fore view of the apparatus taken along the line 5–5 of FIG. 1 showing the width measuring equipment;

DESCRIPTION OF PREFERRED EMBODIMENT

Figure 1:
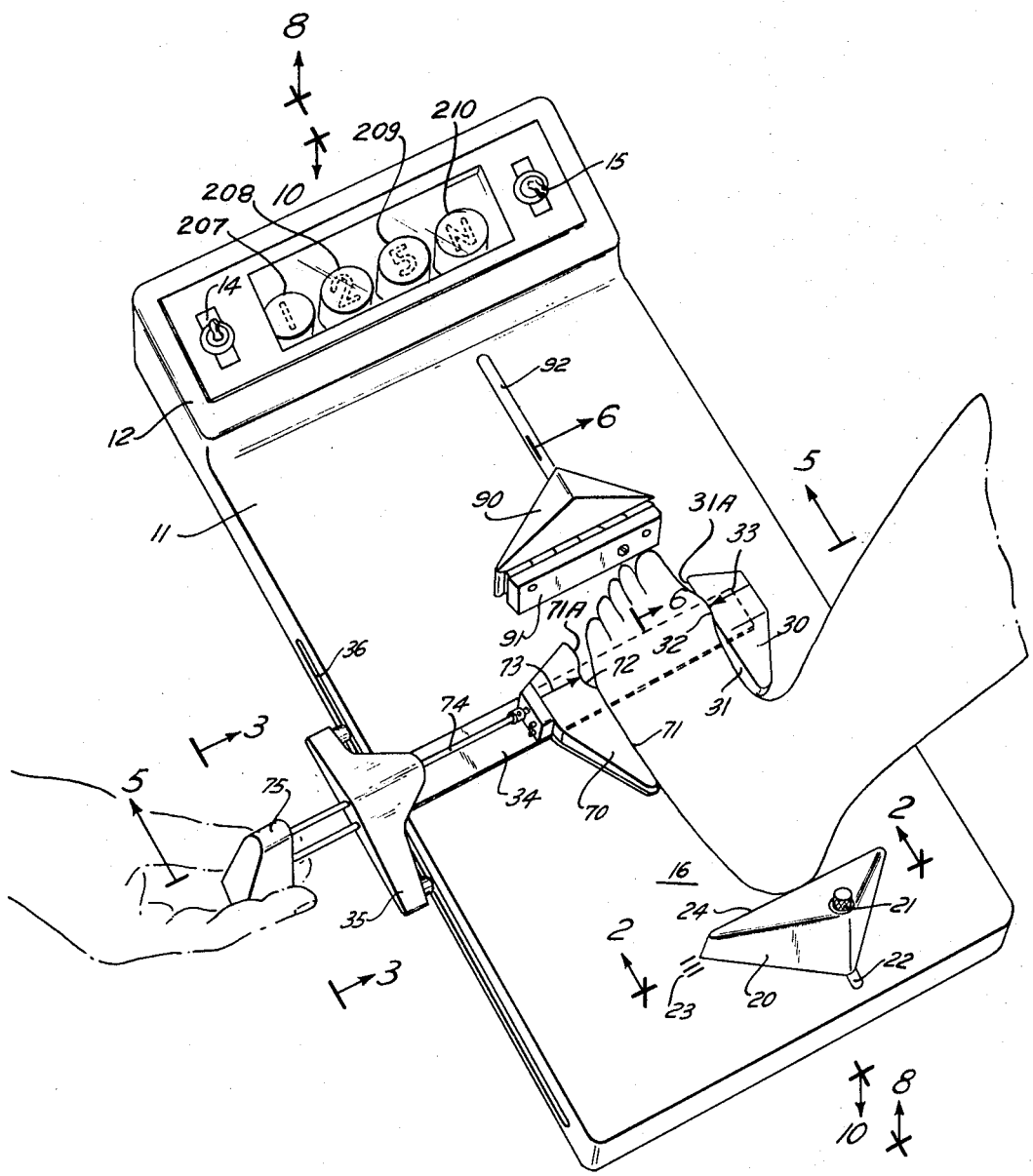
FIG. 1 is a perspective overall view of the foot measuring apparatus in accordance with a preferred embodiment of the invention.

As generally shown in FIG. 1, the foot-measuring apparatus provided by this invention comprises a self-contained portable, compact gauging apparatus having its electrical components, connections and structural members secured within housing 11. A display panel 12 mounted toward the front of 11 houses and supports size indicator tubes 207-209 and switches 14 and 15, all of which are discussed more fully in connection with FIG. 9. Display panel 12 is preferably raised above cover 11 so that the visual size indicators are within the full view of both the fitter and the consumer. The remainder of 11 contains a single measuring zone 16 which is used to measure or gauge both right and left feet without rotating the apparatus or altering any of its components. The boundaries of zone 16 are defined by four gauge blocks, namely, heel block 20, arch blocks 30 and 70 and toe block 90. The front edge 24 of heel block 20 provides a fixed reference from which all length measurements are made.

Recent trends in shoe manufacturing have lead to the development of different base reference points from which to commence shoe length sizes. In order to allow the fitter to adjust for this variance, which is particularly noticeable in both children's and foreign lasts, a preferred embodiment of this apparatus allows heel block 20 to be moved longitudinally over a distance sufficient to adjust for these variations. As shown in FIG. 2 fastening bolt 21 is provided which passes through hole 25 in the heel block, through longitudinal slot 22 in cover 11, through the printed circuit board 120 and into a laterally restrained tension nut 26 and block nut 27. By loosening fastener 21, the heel block 20 can be placed in the correct last reference which is shown by etchings 23 on cover 11. Once the fastening device has been tightened the heel block is firmly and immovable fixed in position.

The arch-length measurement is made along the heel-toe line from the front edge 24 of the heel block 20 to a point where a line parallel to edge 24 intersects both the heel-toe line and the center point where the appropriate right or left arch block 30 or 70 contacts the ball of the foot. The arch blocks are designed so that their interior edges 31 and 71, which form the actual lateral boundaries of the foot-measuring zone have a straight edge, an indentation 32 and 72, respectively, and then straight edges 31A and 71A. The indentations 32 and 72 are shaped to comfortably accept the ball of the left and right foot respectively. The line from the center of indentation 32 shown by the line 33 to the center of indentation 72 shown by the line 73 is parallel to the front edge 24 of heel block 20 and is at right angles to the heel-toe line. Arch blocks 70 and 30 are moved longitudinally with handle 75, but because of their construction, discussed more thoroughly herein, the block indentation center lines always maintain their parallel position with respect to the front edge 24 of the heel block.

To measure the arch length, the foot is placed between arch blocks 70 and 30 with the heel resting against block 20. The arch blocks are then longitudinally adjusted so that the ball of the foot enters the appropriate indentation on the arch block. The arch block indentation to be used depends upon whether the foot to be measured has its ball on the right or left side. For example, when the left foot is placed within measuring zone 16 with the heel resting against edge 24, indentation 32 of block 30 is positioned longitudinally to accept the ball. The measured arch length is the distance along the heel-toe line from edge 24 to line 33 or line 73.

With reference to FIGS. 1, 3 and 4, the parallel longitudinal movement of the arch blocks 30 and 70 is controlled by arch-length control 35. This arch-length control is firmly attached to arch block 30 by bar 34 and to arch block 70 by rod 74. The movement of the arch-length control is directed by slot 36 located on the side edge of housing 11. The physical design of this control and the placement of slot 36, which runs parallel to the heel-toe foot line and extends for a length sufficient to allow the arch blocks to move freely from small to large sizes, are such that the arch blocks have free longitudinal movement with minuscule lateral translations. Arch-length control 35 is held against slot 36 by a suitable fastener, for example, bolts 37 and 38. As shown in FIG. 3 these bolts pass through arch length control 35, through wear plates 39 and 40, through slot 36, and through additional wear units. Finally, these bolts are secured in the arch-length brush block 41. In a preferred embodiment bolts 37 and 38 are equipped with a tension device as, for example, a spring so that the tightness of the arch control against housing 11 will remain constant as the wear plates undergo their normal deterioration. The arch-length brush block 41 which is attached to the arch-length control by bolts 37 and 38 travels inside housing 11. Attached to the arch-length brush block are a series of four electrically conductive brushes 42—45 which make contact with conductive segments on a printed circuit board 120 and electrically energize appropriate circuits connected to the size readout indicator tubes 207—209. As arch-length control 35 moves up and down slot 36, brushes 42—45 move up and down circuit board 120 making contact with different conductors on the printed circuit board as more fully discussed herein.

The width length measurement is made between the center of one of the indentations on the arch block and a line parallel to and touching the straight edges of the other block. Since the widest portion of the foot is not directly opposite the ball of that foot but instead at a point closer to the heel of the foot, there is no chance for the widest portion of the foot under measurement being included between both arch block indentations.

Referring now to FIGS. 1 and 5, foot width is measured by moving arch block 70 laterally with handle 75 so that the foot is held loosely between arch blocks 30 and 70. The lateral movement of block 70 is controlled by rod 74 which passes through arch-length control 35 to handle 75. Arch-length control 35 is designed so that rod 74 can be laterally varied without longitudinally displacing block 70. Rod 74 is attached to arch block 70 by means of an arch attachment 87. In operation the arch block 70 is laterally traversed by a circular opening 196 sufficient to allow passage of rod 74. The opening at the edge of the block closest to width control 75 is expanded sufficiently to allow spring 198 and snap ring 199 to pass part way into the block. The outer extreme of opening 196 is covered with cap 195 having a circular opening sufficient to permit passage of 74. Cap 195 is affixed to block 70 and the spring and snap ring are thereby confined within the arch block. A limiting collar 194 is placed on the rod 74 adjacent 195 to limit lateral movement of the spring-loaded arch block along the rod to an acceptable short distance. However, the arch blocks can be moved laterally by compressing the spring until the lid comes in contact with the limiting collar.

The exterior end of rod 74 is coupled to handle 75 which is provided to both position longitudinally arch control 35 as well as laterally position arch block 70. Electrical readout means for the width measurement are coupled by rod 76 to handle 75. As shown in FIG. 5 rod 76 terminates in bullet block 77 having brush 78 in contact with printed circuit board 120, and brush 79 in contact with a ground power plate 80 secured to the bottom 81 of 11. Brushes 78 and 79 physically and electrically connected through block 77 by a conductive spring (not shown). As arch blocks 30 and 70 are moved longitudinally to measure the arch length of a foot, brush 79 moves up and down the printed circuit board in contact with an electrically conductive scale arranged to energize and thereby indicate on tube 210 the correct width size for the associated arch length. Thus in accordance with a principal feature of the invention, width measurement is directly associated and correlated with the measurement of arch length.

Figure 6:
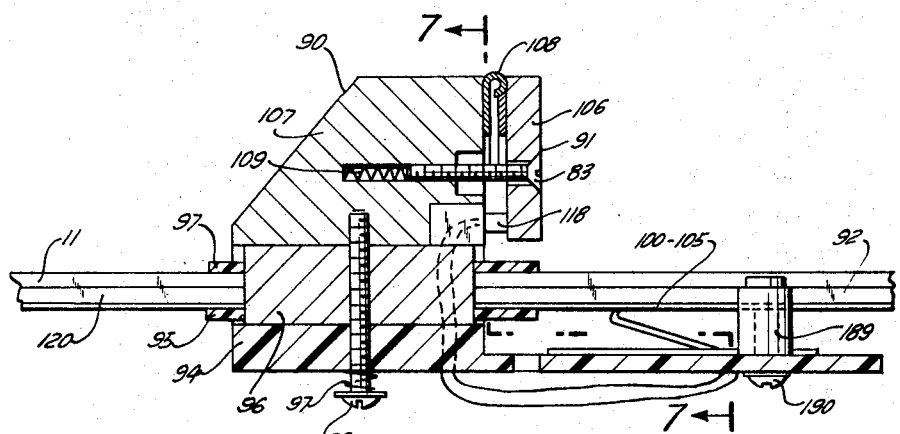
FIG. 6 is a fragmental cutaway side view of the toe-length indicator taken along the line 6–6 of FIG. 1.
Figure 7:
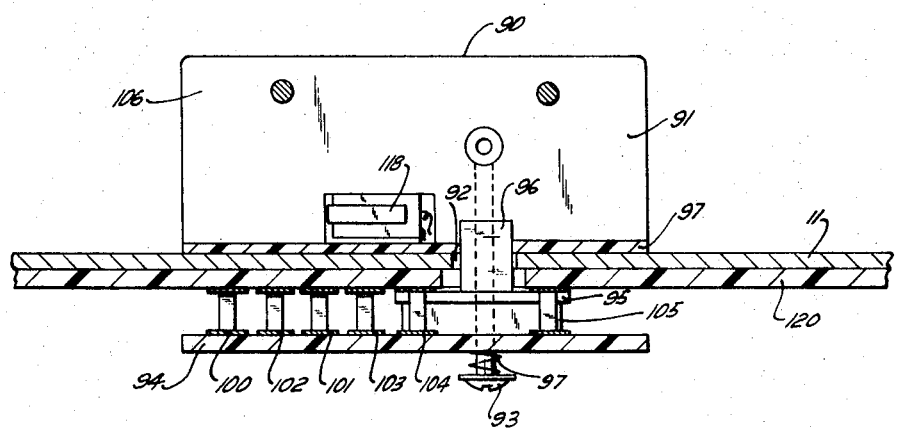
FIG. 7 is a fragmental cutaway view of the toe length indicator as taken along the line 7–7 of FIG. 6.

As shown in the preferred embodiment of the invention illustrated in FIG. 1, an independent means is provided for measuring the heel-toe length of the foot. This length is measured by longitudinally moving toe block 90 so that the toe is touching the front edge 91 of block 90 when the heel is touching the front edge 24 of heel block 20. As shown in FIGS. 6 and 7, toe block 90 is moved along and its direction is controlled by slot 92 which runs along the heel-toe line of housing 11. Toe block 90 is movably supported on housing 11 by bolt 93 which passes through toe-length brush block 94, wear plates 95, slot 92 and wear plates 96. Spring 97 is provided to maintain a constant pressure between the toe block 90 and 11 as friction units 95 and 96 undergo normal wear. In order to assure the longitudinal rigidity of the toe block a screw 190 is passed through the toe-length brush block 94 into a guide 189 which rides in slot 92 but does not protrude from housing 11.

As shown in FIG. 7, toe-length brush block 94 has six electrically conductive brushes 100—105 connected to it. As toe block 90 moves up and down slot 92, brushes 100—105 move up and down circuit board 120 making electrical contacts with various conductor scale segments indicative of the length of the foot being measured as further explained below.

The front edge 91 of toe block 90, as best seen in FIG. 6, consists of a separate unit 106 which is attached to the main body 107 of the toe block 90 by a hinge 108 which is located at the top of block 90. The main body 106 is laterally traversed by a circular opening 109. The portion of this opening which is closest to the separate unit 106 is expanded to allow a spring to pass part way into the block. A screw is passed through unit 106 to which it is firmly attached, through the spring, into the circular opening in the main body 107. The spring allows the front edge 91 of toe block 90 to be longitudinally moved toward the main body of toe block 90. In a particularly preferred embodiment a pressure sensitive microswitch 118 is placed on the main piece 107 such that when unit 108 comes in contact with the microswitch an audible buzzer warning signal is actuated. The toe block is in the correct measuring position when the front edge 91 is touching the toe without actuation of the microswitch and warning signal.

Figure 8:
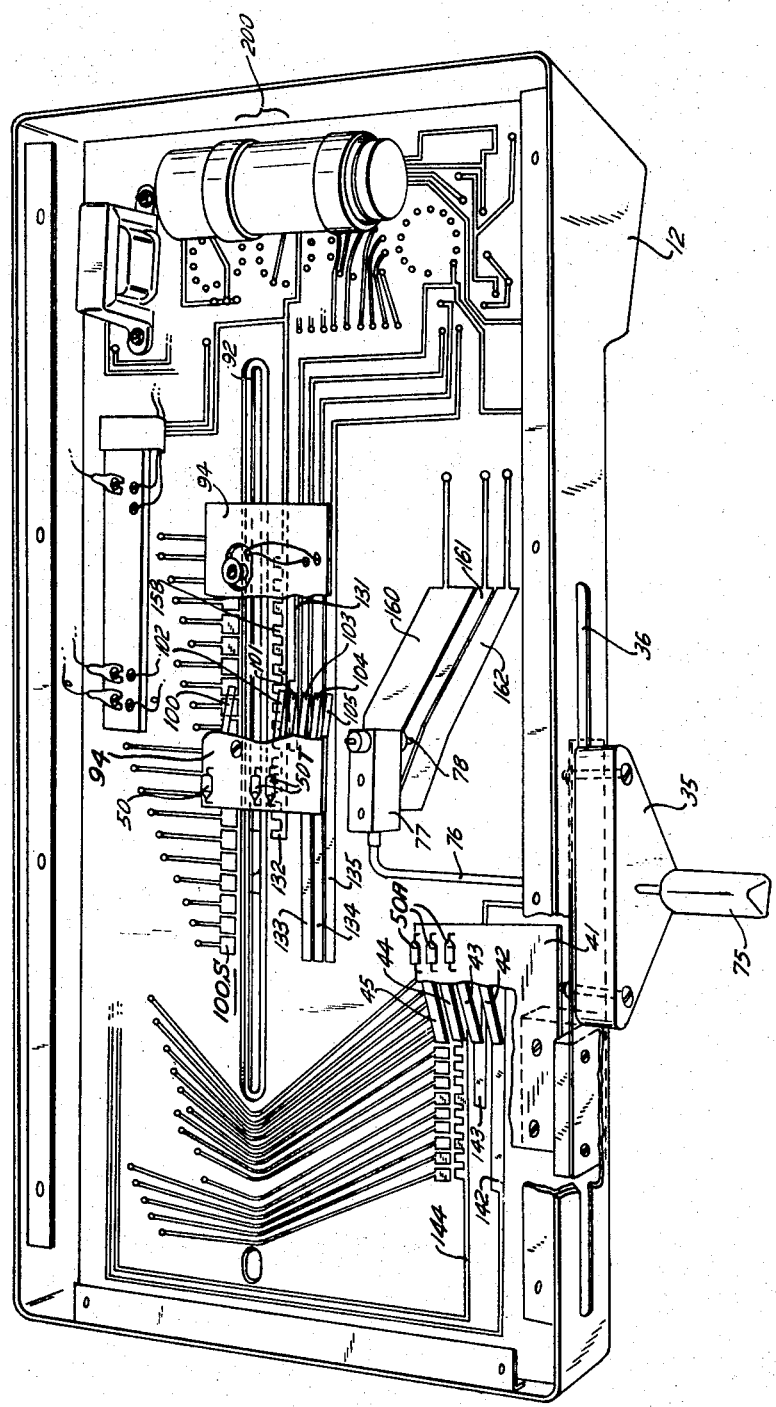
FIG. 8 is a perspective overall view of the foot measuring apparatus taken along 8–8 of FIG. 1 from the bottom with the baseplate and sections of the brush plates removed.
Figure 9:
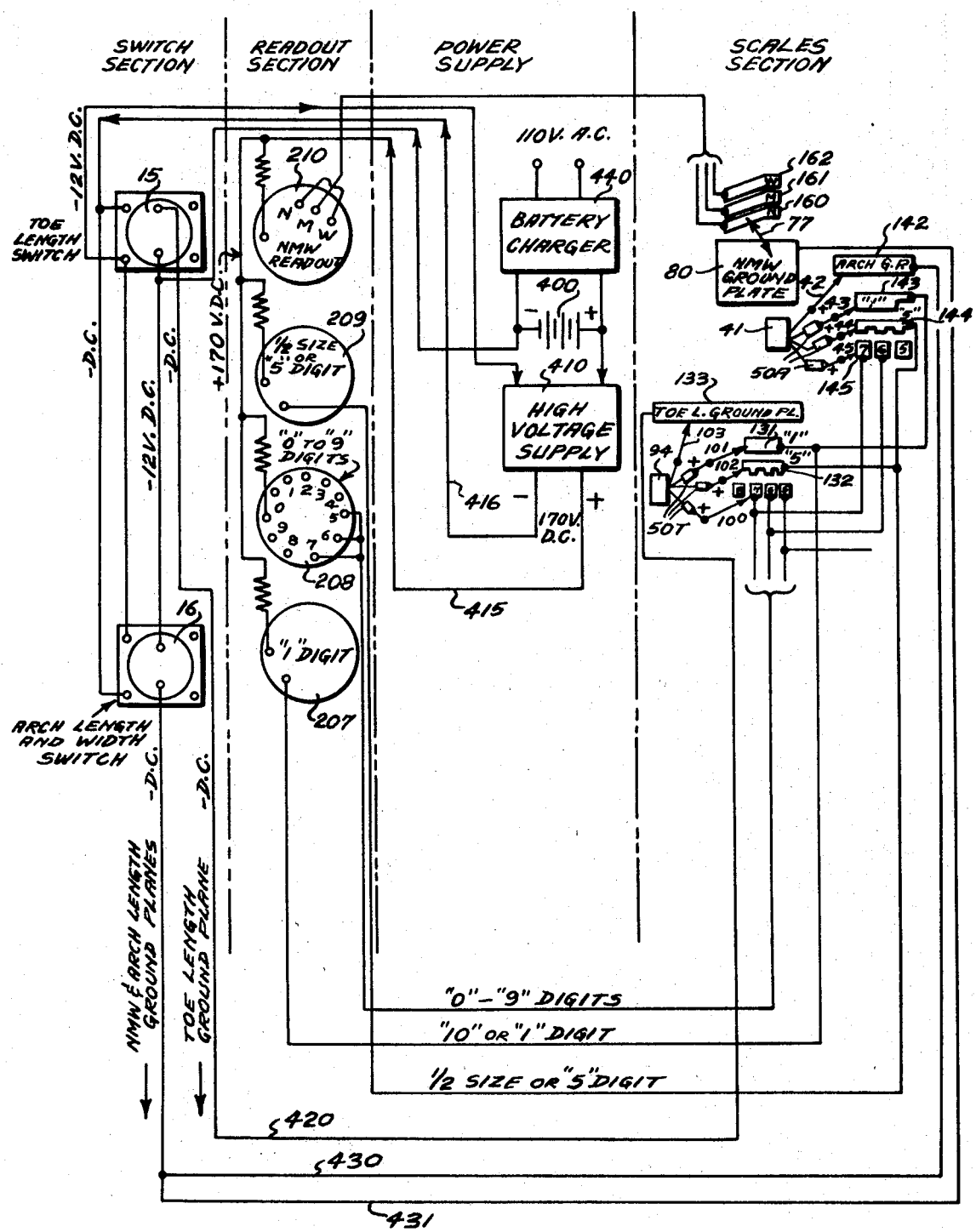
FIG. 9 is a simplified schematic diagram of the electrical measuring and indicating circuits.
Figure 10:
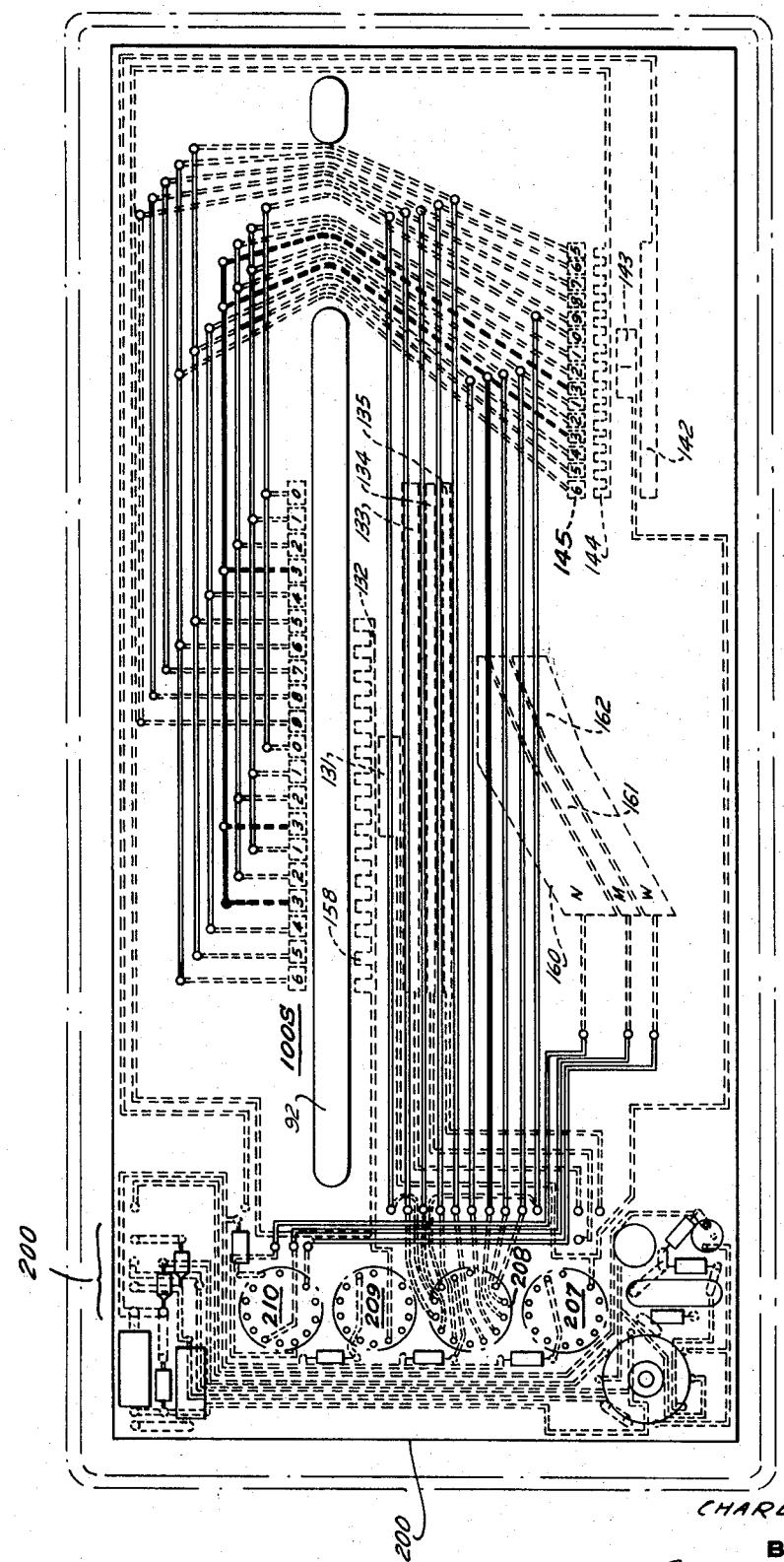
FIG. 10 is an overlay view of the printed circuit board for the measurement and indicator circuits.

The electrical circuit and scaling system provided to interpret the movement of the various blocks is best shown by FIGS. 8, 9 and 10. As shown in FIG. 8, the printed circuit board 120 supports the commutator switch segments and associated circuit connections for electrically indicating the measured foot dimensions.

The accurately positioned switch scales are converted to readable symbols by means of an electrical readout system. Six brushes 100—105 supported by the toe-length brush block 94 contact with either a continuous conductor strip or an array of commutator switch segments, each of which is connected to a separate cathode element of a cold cathode readout tube such as a Nixie tube manufactured by Burroughs. More specifically, brush 103 contacts the toe-length ground strip 133 which is connected to the negative terminal of a DC high voltage supply as described more fully below and to brushes 100, 101 and 102 via brush 103. Brush 102 is positioned to sequentially contact and electrically energize the half-size scale segments 158 of the toe-length scale and thereby energize tube 209.

Strip 131 which is contacted and electrically energized by brush 101 is provided to switch on the tens digit indicator 207 when the foot size exceeds 9, i.e., brush 101 is in contact with strip 131 when the shoe size is 10 or greater. Brush 100 is positioned to sequentially contact an array of separate conductive segments 100S, each of which is connected to a separate cathode element (zero to nine) in the unit digit readout tube 208. If the indicated shoe size is 9, for example, DC voltage is switched from the brush box into the circuit which is connected to the nine indicator of the length size readout tube 208. If the shoe sizes is 12½, DC voltage is connected by the respective brushes to the half-size indicator strip 132, the tens indicator strip 131, and the segment in array 100S connected with the unit indicator reading 2.

Strips 134 and 135 which are connected to the toe length brush block by brushes 104 and 105 are used to transfer the signal from the spring warning switch in the toe block to a warning system (not shown).

Similar to the toe-length system the arch-length brush plate has four brushes 42—45. Brush 42 comes in contact with arch ground plane 142. The tens unit indicator is controlled by strip 143 which is activated by brush 43. The half-size indicator is controlled by strip 144 which is activated by brush 44. Brush 45 makes contact with one of the arch-length switch segments 145 which are in turn connected to one of the zero to nine cathode elements in the length units readout tube 208.

Somewhat similar to the arch- and toe-length system is the width system. Block 77 contacts ground plate 90 (See FIG. 9). The other end of the bullet block comes in contact with one of three strips 160—162 angularly positioned to measure and indicate narrow (N), medium (M) and wide (W) for the expanding width, length relationship. Depending upon the strip on the printed circuit contacted by bullet 78 an appropriate width size for the given arch length will appear on the width readout tube 210.

It should be noted that the particular apparatus disclosed in FIGS. 8, 9 and 10 is basically designed for measuring children's feet. Therefore, although it has size indicators for infant, youth and small adult shoe sizes, the width scales are designed only to indicate narrow 160, normal 161, and wide 162 feet. These are the normal width sizes for children's shoes. However, this apparatus can easily be modified to cover all shoe lengths and widths.

As best seen in FIG. 10, which shows an overlapping copy of the front and back sides of the circuit board 120, all of the circuits which would light up a portion of a readout tube are connected to each other so that the same indicator tubes may be used to readout the various arch and toe-heel measurements. The "3's," for example, given by a reading of adult toe length size 3, youth size 13, and infant 3; and of arch length adult size 3, youth 13, and infant 3, are all connected together and then connected to the number 3 cathode on the length "unit" digit tube 208. This is illustrated by the darkened line in FIG. 10. Similarly, the half-size arch length and the half-size toe length strips are electrically connected together for energization of cathode 5 of 209. The tens digit strips are likewise connected. Because of the parallel connections of the various switching segments arranged to energize the readout tubes, it is necessary to provide protection against false readings produced by so called sneak circuit combinations. To this end blocking diodes 50A are connected in series with each of the brushes 43—45 as shown in FIG. 9 and poled to prevent reverse current flow between the paralleled switch contacts.

The power system used to activate the cold cathode visual readout tubes is shown in the simplified block and schematic diagram of FIG. 9. The portable foot-measuring apparatus is powered by battery 400 which is arranged to energize high voltage DC supply 410 either through the actuation of toe-length measuring switch 15 or arch-length and width measuring switch 16 as shown. The positive DC output lead 415 is directly connected to the respective anode terminals of the cold cathode indicator tubes 207—210 while the negative lead 416 is connected alternatively by the actuation of switch 15 via lead 420 to toe-length ground plane 133 or by the actuation of switch 16 via leads 430 and 431 to ground planes 142 and 80 respectively. Charger 440 is provided to periodically recharge battery 410.

It should be understood that various modifications may be made in the preferred embodiment of the invention described above without departing from the scope of the invention as defined by the claims.

I claim:
1. Foot-size measuring apparatus comprising
   a. a housing having an exterior foot-receiving area thereon;
   b. a heel gauge block affixed to the foot-receiving area having a reference surface provided to define the heel position for foot length measurements;
   c. first and second ball-foot gauging blocks each having a planar inner face surface with an intermediate curved recess surface provided to accept the curved ball of a human foot;
   d. means for movably supporting said ball-foot gauging blocks in a longitudinal direction along the heel-toe line of a foot to be measured while maintaining the planar inner face surfaces of the blocks in parallel alignment with the heel-toe line and the ball-receiving surfaces opposite one another on a centerline perpendicular to said heel-toe line;
   e. means for laterally moving one of said ball-foot gauge blocks with respect to the other to change the width spacing between the inner face surfaces thereof;
   f. calibrated means for measuring and indicating the lateral width separations of said ball-foot gauge blocks; and
   g. calibrated means for measuring and indicating the longitudinal separation along the heel-toe line between the reference surface of said heel gauge block and the perpendicular centerline for the recess surfaces of the ball-foot gauge blocks.

2. Foot-size measuring apparatus comprising:
   a. a housing having an exterior foot-receiving area thereon;
   b. a heel gauge block affixed to the foot-receiving area having a reference surface provided to define the heel position for foot length measurements;
   c. first and second ball-foot gauging blocks having a planar inner face surface with an intermediate curved recess surface provided to accept the curved ball of a human foot;
   d. means for movably supporting said ball foot-gauging blocks in a longitudinal direction along the heel-toe line of a foot to be measured while maintaining the planar inner face surfaces of the blocks in parallel alignment with the heel-toe line and the ball-receiving surfaces opposite one another on a centerline perpendicular to said heel-toe line;
   e. means for laterally moving one of said ball-foot gauge blocks with respect to the other to change the width spacing between the inner face surfaces thereof;
   f. a toe gauge block supported on said housing for movement in a longitudinal direction along the heel-toe line of the foot to be measured and having a reference surface for contacting the furthest extending toe of the foot to be measured;
   g. calibrated means for measuring and indicating the lateral width separations of said ball-foot gauge blocks; and
   h. calibrated means for measuring and indicating the longitudinal separation along the heel-toe line between the reference surface of said heel gauge block and either the reference surface of said toe gauge block or the perpendicular centerline for the recess surfaces of the ball-foot gauge blocks.

3. Apparatus in accordance with claim 1 wherein first segmented switch means are provided to measure the longitudinal displacement of said ball-foot gauge blocks from said heel-block and electrically energize cold-cathode display tubes to indicate arch-length foot size and second segmented switch means are provided to simultaneously measure lateral displacement between said ball-foot gauge blocks and electrically energize a cold-cathode type display to indicate arch-width size.

4. Apparatus in accordance with claim 2 wherein first segmented switch means are provided to measure the longitudinal displacement of said ball-foot gauge blocks from said heel block and electrically energize cold-cathode display tubes to indicate arch-length foot size, second segmented switch means are provided to simultaneously measure lateral displacement between said ball-foot gauge blocks and electrically energize a cold-cathode type display to indicate arch-width size and third segmented switch means are provided to measure longitudinal displacement of said toe gauge block from said heel block and electrically energize cold-cathode display tubes to indicate toe-heel size.

5. Apparatus in accordance with claim 4 wherein the first and third segmented switch means are connected in parallel with isolating diodes therebetween and switch means are provided to selectively connect a single set of cold-cathode display tubes to either said first or third segmented switch means to indicate arch-length size or toe-heel size respectively.

6. Apparatus in accordance with claim 1 wherein adjustable means are provided for changing the fixture position of the heel gauge block over a limited longitudinal distance along the heel-toe line.

7. Apparatus in accordance with claim 2 wherein adjustable means are provided for changing the fixture position of the heel gauge block over a limited longitudinal distance along the heel-toe line.